US009454704B2

(12) United States Patent
Baba et al.

(10) Patent No.: US 9,454,704 B2
(45) Date of Patent: Sep. 27, 2016

(54) APPARATUS AND METHOD FOR DETERMINING MONITORING OBJECT REGION IN IMAGE

(71) Applicant: FUJITSU LIMITED, Kawasaki-shi, Kanagawa (JP)

(72) Inventors: Kozo Baba, Oita (JP); Kunikazu Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/619,364

(22) Filed: Feb. 11, 2015

(65) Prior Publication Data
US 2015/0154460 A1 Jun. 4, 2015

Related U.S. Application Data

(63) Continuation of application No. PCT/JP2012/072268, filed on Aug. 31, 2012.

(51) Int. Cl.
*G06K 9/00* (2006.01)
*G06T 7/00* (2006.01)
(Continued)

(52) U.S. Cl.
CPC ......... *G06K 9/00805* (2013.01); *G06K 9/4661* (2013.01); *G06T 7/0044* (2013.01); *G06T 7/0083* (2013.01); *G06T 7/2033* (2013.01); *G06T 7/2053* (2013.01); *G06T 2207/10016* (2013.01); *G06T 2207/20068* (2013.01); *G06T 2207/20216* (2013.01); *G06T 2207/20224* (2013.01); *G06T 2207/30252* (2013.01); *G06T 2207/30261* (2013.01)

(58) Field of Classification Search
None
See application file for complete search history.

(56) References Cited

U.S. PATENT DOCUMENTS

| 4,079,519 A * | 3/1978 | Carmouche | B62D 15/00 33/264 |
| 5,245,422 A * | 9/1993 | Borcherts | G05D 1/0246 348/119 |
| 6,765,480 B2 * | 7/2004 | Tseng | G06K 9/00805 340/425.5 |

(Continued)

FOREIGN PATENT DOCUMENTS

| JP | 2000-315255 | 11/2000 |
| JP | 2002-056388 | 2/2002 |

(Continued)

OTHER PUBLICATIONS

International Search Report, mailed in connection with PCT/JP2012/072268 and mailed on Oct. 23, 2012.

*Primary Examiner* — Randolph I Chu
(74) *Attorney, Agent, or Firm* — Fujitsu Patent Center

(57) ABSTRACT

An image processing apparatus includes a processor. The processor is configured to execute a process including creating an average image of difference images in moving picture data based on a difference between a first frame and a second frame adjacent to the first frame, the first frame and the second frame included in the moving picture data, calculating a sum total of luminance values arranged in a lateral direction of the average image for each point in a longitudinal direction of the average image, selecting a predetermined number of points that are higher in value of a secondary differential value of the sum total of luminance values, from among points located in a downward direction from a position of a vanishing point in the average image, and firstly specifying a point that is on a boundary between a hood and a road from among the predetermined number of selected points.

5 Claims, 11 Drawing Sheets

(51) Int. Cl.
*G06T 7/20* (2006.01)
*G06K 9/46* (2006.01)

(56) References Cited

U.S. PATENT DOCUMENTS

| | | | |
|---|---|---|---|
| 7,623,680 B2 | 11/2009 | Takahama et al. | |
| 7,837,249 B2 * | 11/2010 | Uematsu | B60J 1/02 |
| | | | 296/96.19 |
| 7,899,621 B2 * | 3/2011 | Breed | B60N 2/2863 |
| | | | 340/995.1 |
| 2003/0016287 A1 | 1/2003 | Nakayama et al. | |
| 2006/0213714 A1 * | 9/2006 | Igawa | B60R 21/0134 |
| | | | 180/274 |
| 2008/0110556 A1 * | 5/2008 | Kawasaki | B60W 40/072 |
| | | | 156/238 |
| 2009/0074250 A1 | 3/2009 | Takahashi et al. | |
| 2010/0104139 A1 * | 4/2010 | Kuehnle | G06K 9/00798 |
| | | | 382/106 |
| 2015/0088378 A1 * | 3/2015 | Sugai | B60G 17/018 |
| | | | 701/37 |
| 2015/0168174 A1 * | 6/2015 | Abramson | G01C 21/3697 |
| | | | 701/408 |

FOREIGN PATENT DOCUMENTS

| | | |
|---|---|---|
| JP | 2003-030626 | 1/2003 |
| JP | 2004-280194 | 10/2004 |
| JP | 2006-018751 | 1/2006 |
| JP | 2008-257378 | 10/2008 |
| JP | 2009-023560 | 2/2009 |
| WO | 2007139035 | 12/2007 |

* cited by examiner

FIG.3

| FRAME NUMBER | DATE AND HOUR | VELOCITY | ACCELERATION | ... | POSITION COORDINATE | IMAGE |
|---|---|---|---|---|---|---|
| N-1 | DATE AND HOUR XN-1 | VELOCITY AN-1 | ACCELERATION BN-1 | | xn-1, yn-1 | IMAGE DATA IN FRAME N-1 |
| N | DATE AND HOUR XN | VELOCITY AN | ACCELERATION BN | | xn, yn | IMAGE DATA IN FRAME N |
| N+1 | DATE AND HOUR XN+1 | VELOCITY AN+1 | ACCELERATION BN+1 | | xn+1, yn+1 | IMAGE DATA IN FRAME N+1 |
| | | | | ... | | |

141

US 9,454,704 B2

APPARATUS AND METHOD FOR DETERMINING MONITORING OBJECT REGION IN IMAGE

CROSS-REFERENCE TO RELATED APPLICATION

This application is a continuation of International Application No. PCT/JP2012/072268, filed on Aug. 31, 2012 and designating the U.S., the entire contents of which are incorporated herein by reference.

FIELD

The embodiments discussed herein are directed to an image processing apparatus and an image processing method.

BACKGROUND

If it is possible to inform drivers of information of positions where near misses ("hiyari-hatto" in Japanese), that is, events for which drivers feel a chill or are startled, such as being about to come in touch with a crossing person during driving, tend to occur, it is possible to prevent an accident from occurring. For specifying information of positions where near misses tend to occur, data recorded in a drive recorder can be utilized. For example, a position of a vehicle, data and hour of imaging, acceleration of the vehicle, a velocity of the vehicle, a video image in front of the vehicle, and so forth are recorded in the drive recorder.

If it is attempted to detect near misses on the basis of only numerical value data such as the acceleration recorded in the drive recorder, events which were not near misses in fact are falsely detected as near misses in some cases. This is because there is a case where the acceleration changes abruptly during traveling of a vehicle due to up and down of a road or the like even if they have no relations to near misses.

For preventing false detection of near misses as described above, it is demanded to analyze whether there is a near miss from a video image in front of the vehicle recorded together with the acceleration.

As causes of occurrence of near misses, existence of detection objects, such as a front car, a crossing person, and a bicycle existing in an own lane can be mentioned. For determining whether the detection object that might be a cause of a near miss exists, therefore, it is determined whether a body detected from a video image exists in the own lane. As the conventional technique that treats the own lane as a monitoring object region of a detection object, a conventional technique that treats a lane in which the own vehicle is traveling and a conventional technique that treats as a region coupling white line positions on the left and right of the own vehicle and the infinite point as a monitoring object region can be mentioned.

With regard to the conventional technology, see Japanese Laid-open Patent Publication No. 2000-315255, Japanese Laid-open Patent Publication No. 2004-280194, and Japanese Laid-open Patent Publication No. 2006-018751, for example.

SUMMARY

According to an aspect of an embodiment of the present invention, an image processing apparatus includes a processor. The processor is configured to execute a process including creating an average image of difference images in moving picture data based on a difference between a first frame and a second frame adjacent to the first frame, the first frame and the second frame included in the moving picture data, calculating a sum total of luminance values arranged in a lateral direction of the average image for each point in a longitudinal direction of the average image, selecting a predetermined number of points that are higher in value of a secondary differential value of the sum total of luminance values, from among points located in a downward direction from a position of a vanishing point in the average image, and firstly specifying a point that is on a boundary between a hood and a road from among the predetermined number of selected points.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of a data structure of drive recorder information;

DESCRIPTION OF EMBODIMENTS

In some cases, a region where a hood of the vehicle is imaged is included in a monitoring object region. As a matter of course, the region where the hood is imaged is a region where a detection object does not exist. Therefore, it is considered to exclude the region of the hood from the monitoring object region. In such a case, a method of detecting the region of the hood by using, for example, a template image is conceivable.

In such a method, however, there is a problem that a region of the hood of the vehicle excluded from the monitoring object region is not detected accurately.

For example, in the detection method of the region of the hood as described above, light is reflected by the hood and similarity between the hood region and the template image becomes low and consequently it is difficult to detect the hood region accurately. By the way, the attaching position of a camera for drive recorder varies from vehicle to vehicle. Therefore, it is not possible to uniquely determine the position of the hood region on an image.

Hereafter, embodiments of an image processing apparatus, an image processing method, and an image processing program will be described in detail on the basis of the drawings. By the way, the present invention is not restricted by the embodiments.

[a] First Embodiment

Figure 1:
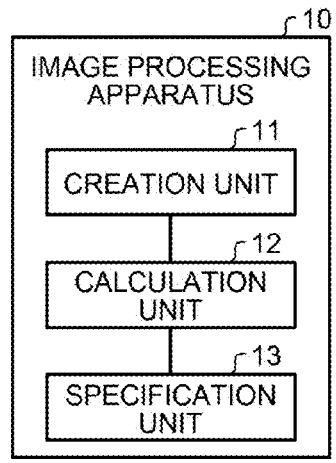
FIG. 1 is a functional block diagram illustrating a configuration of an image processing apparatus according to a first embodiment.

A configuration of an image processing apparatus according to the first embodiment will now be described. FIG. 1 is a functional block diagram illustrating the configuration of the image processing apparatus according to the first embodiment. As illustrated in FIG. 1, an image processing apparatus 10 includes a creation unit 11, a calculation unit 12, and a specification unit 13.

The creation unit 11 creates an average image of difference images in moving picture data on the basis of a difference between two adjacent frames in one moving picture data.

The calculation unit 12 calculates a sum total of luminance values in the lateral direction of the average image every point in the longitudinal direction of the average image.

The specification unit 13 selects a predetermined number of points that are higher in value of a secondary differential value of sum total of luminance values, from among points located in a downward direction from a position of a vanishing point in the average image, and specifies a point that is on a boundary between a hood and a road from among the selected predetermined number of points.

Effects brought about by the image processing apparatus 10 according to the first embodiment will now be described. The image processing apparatus 10 creates an average image of a difference image in moving picture data on the basis of difference between two adjacent frames in one moving picture data, and the image processing apparatus 10 calculates the sum total of luminance values in the lateral direction of the created average image, every point in the longitudinal direction of the average image. The image processing apparatus 10 selects a predetermined number of points that are higher in value of a secondary differential value of sum total of luminance values, from among points located in a downward direction from a position of a vanishing point in the average image, and specifies a point that is on a boundary between a hood and a road from among the selected predetermined number of points. For example, external light is reflected in tip portions of the hood. Therefore, a difference between a sum total of the above-described luminance values corresponding to a region of a tip portion of the hood in the image and a sum total of the above-described luminance value corresponding to a region adjacent to the tip portion becomes as follows. That is, such a difference is greater than a difference between the sum total of the above-described luminance values corresponding to a region other than the region of the tip portion and the sum total of the above-described luminance values corresponding to a region adjacent to the region other than the region of the tip portion, in many cases. In many cases, therefore, a secondary differential value of the sum total of luminance values corresponding to the region of the tip portion of the hood is greater than a secondary differential value of the sum total of luminance values corresponding to another region. Furthermore, depending upon the position of a light source, the light source is imaged on the hood imaged in a frame, in some cases. In such a case, there is no change in that the secondary differential value of the sum total of luminance values corresponding to the region of the tip portion of the hood is roughly greater than the secondary differential value corresponding to another region. Sometimes, however, a further greater secondary differential value is calculated at a Y coordinate in a position where the light source is imaged. The image processing apparatus 10 selects a predetermined number of points that are higher in secondary differential value of the sum total of luminance values, and specifies a point on a boundary between the hood and a road from among the selected predetermined number of points. As a result, it is possible to accurately detect a hood region of a vehicle excluded from the monitoring object region.

[b] Second Embodiment

Figure 2:
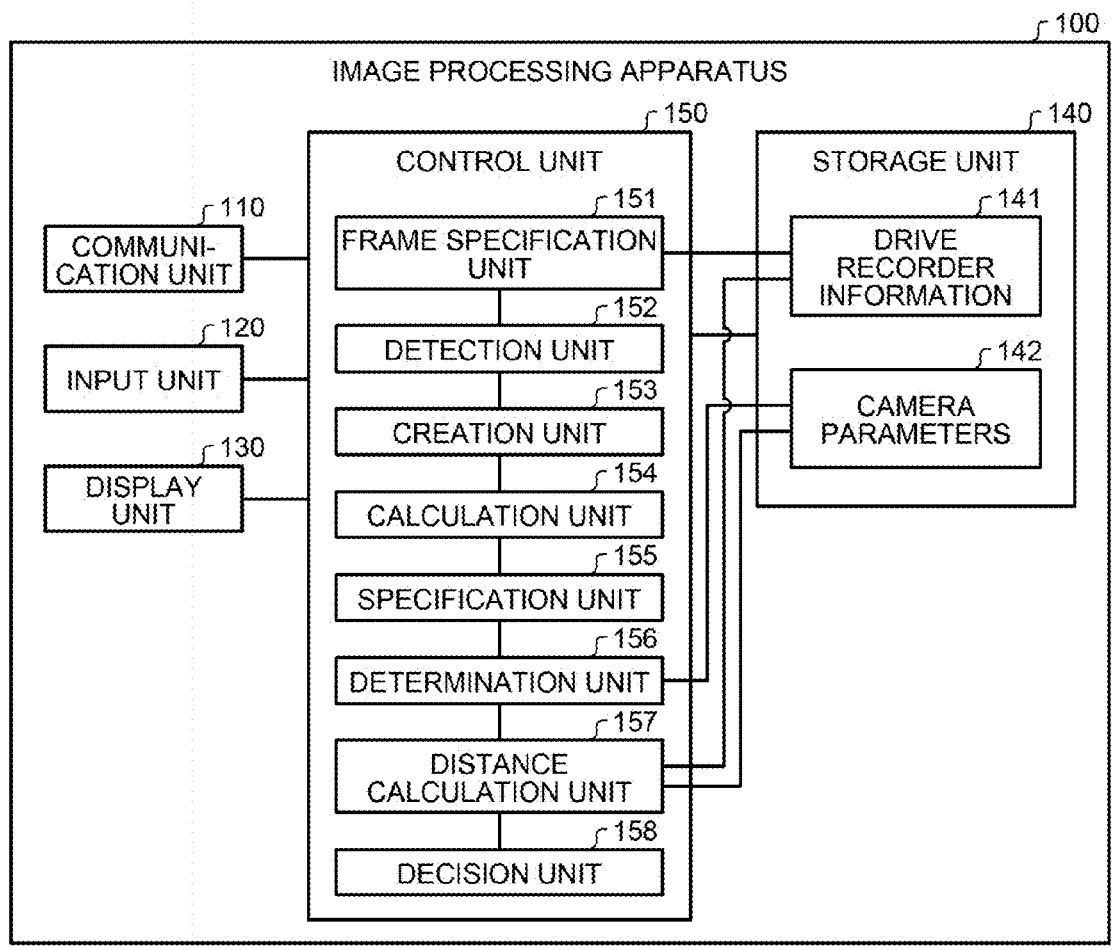
FIG. 2 is a functional block diagram illustrating a configuration of an image processing apparatus according to a second embodiment.

A configuration of an image processing apparatus according to a second embodiment will now be described. FIG. 2 is a functional block diagram illustrating a configuration of an image processing apparatus according to the second embodiment. As illustrated in FIG. 2, an image processing apparatus 100 includes a communication unit 110, an input unit 120, a display unit 130, a storage unit 140, and a control unit 150.

The communication unit 110 is a processing unit that executes data communication with another apparatus via a network. For example, the communication unit 110 corresponds to a communication device or the like.

The input unit 120 is an input device that inputs various data to the image processing apparatus 100. For example, the input unit 120 corresponds to a keyboard, a mouse, a touch panel and so forth. The display unit 130 is a display device that displays data output from the control unit 150. For example, the display unit 130 corresponds to a liquid crystal display, a touch panel, or the like.

The storage unit 140 is a storage unit that stores drive recorder information 141 and camera parameters 142. The storage unit corresponds to a storage device, such as a semiconductor memory element, such as, for example, RAM (Random Access Memory), ROM (Read Only memory), and flash memory.

The drive recorder information 141 includes various data recorded by a drive recorder. For example, the drive recorder information 141 is moving picture data for several seconds before and after a time point at which acceleration has changed by at least a predetermined value. FIG. 3 is a diagram illustrating an example of a data structure of the drive recorder information. As illustrated in FIG. 3, the drive recorder information 141 stores a frame number, a date and hour, a velocity, acceleration, position coordinates, and an image to be associated with each other. The frame number is a number that uniquely specifying a frame. The date and hour are data and hour when the pertinent frame was imaged. The velocity is a velocity of a vehicle mounting the drive recorder at a time point when the pertinent frame was imaged. Furthermore, the position coordinates are position coordinates of the vehicle mounting the drive recorder at a time point when the pertinent frame was imaged. Furthermore, the image is image data of the pertinent frame.

The camera parameters 142 include parameters of a camera utilized by the drive recorder. The camera parameters 142 will be described specifically later.

The control unit 150 includes a frame specification unit 151, a detection unit 152, a creation unit 153, a calculation unit 154, a specification unit 155, a determination unit 156, a distance calculation unit 157, and a decision unit 158. The control unit 150 corresponds to an integrated device, such as, for example, an ASIC (Application Specific Integrated Circuit) or an FPGA (Field Programmable Gate Array). Furthermore, the control unit 150 corresponds to an electronic circuit, such as, for example, a CPU (Central Processing Unit) or an MPU (Micro Processing Unit).

The frame specification unit 151 is a processing unit that refers to the drive recorder information 141 and specifies a frame imaged in a case where a vehicle mounting a drive recorder and a camera travels rectilinearly. For example, the frame specification unit 151 can specify a frame imaged in a case where the vehicle travels rectilinearly, by utilizing acceleration in the drive recorder information 141 and specifying image data of a frame in a case where acceleration is approximately zero from the drive recorder information 141. By the way, a frame in the case where the acceleration is approximately zero means a frame in which the acceleration is, for example, in a range of $-\alpha$ to $\alpha$. Here, $\alpha$ is a predetermined value. In the ensuing description, a frame imaged in a case where the vehicle travels rectilinearly is referred to as processing frame. By specifying the processing frame in this way, the frame specification unit 151 can exclude frames that have movement in up, down, left or right imaged in a case where the vehicle travels on a curved road or a case where the vehicle travels on a road having a difference in level or the like, from frames used in various kinds of processing described later.

Figure 4A:
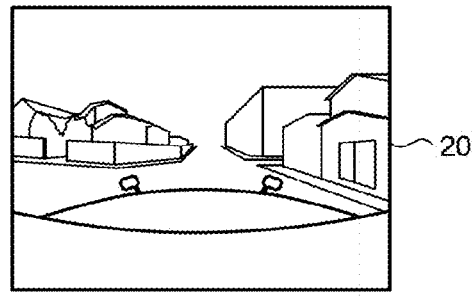
FIG. 4A is a diagram illustrating an example of a processing frame.
Figure 4B:
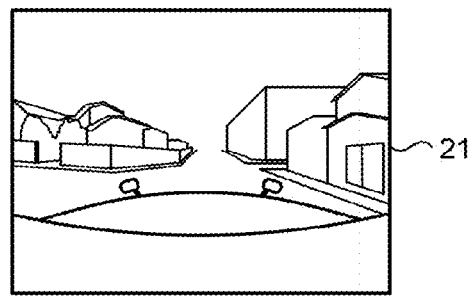
FIG. 4B is a diagram illustrating an example of a processing frame.
Figure 4C:
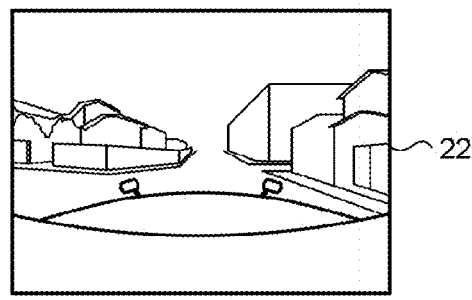
FIG. 4C is a diagram illustrating an example of a processing frame.
Figure 4D:
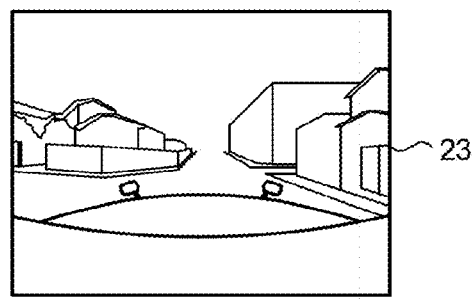
FIG. 4D is a diagram illustrating an example of a processing frame.

An example of a processing frame specified by the frame specification unit 151 will now be described. FIGS. 4A to 4D are diagrams illustrating an example of the processing frame. A processing frame 20 specified by the frame specification unit 151 from among a plurality of frames imaged by a camera with a predetermined frame rate is illustrated in FIG. 4A. Furthermore, a processing frame 21 specified by the frame specification unit 151 from among the plurality of frames is illustrated in FIG. 4B. By the way, the processing frame 21 is a frame imaged by the camera next to the processing frame 20. The processing frame 20 and the processing frame 21 are adjacent frames. Furthermore, a processing frame 22 specified by the frame specification unit 151 from among the plurality of frames is illustrated in FIG. 4C. By the way, the processing frame 22 is a frame imaged by the camera next to the processing frame 21. The processing frame 21 and the processing frame 22 are adjacent frames. Furthermore, a processing frame 23 specified by the frame specification unit 151 from among the plurality of frames is illustrated in FIG. 4D. By the way, the processing frame 23 is a frame imaged by the camera next to the processing frame 22. The processing frame 22 and the processing frame 23 are adjacent frames. As illustrated in FIGS. 4A to 4D, images of the processing frames 20 to 23 change with the rectilinear travel of the vehicle.

Furthermore, the frame specification unit 151 can also specify a processing frame by utilizing the velocity in the drive recorder information 141 and specifying image data of a frame in a case where the velocity change is approximately zero from the drive recorder information 141. By the way, a frame in a case where the velocity change is approximately zero means, for example, a frame in which the velocity change is in a predetermined range.

In addition, the frame specification unit 151 can also compare position information of each frame with map information and specify each frame located on a rectilinear road indicated by the map information, as a processing frame.

The detection unit 152 is a processing unit that detects a vanishing point in a processing frame. For example, the detection unit 152 detects candidate points which will be described later, in each processing frame. Then, the detection unit 152 calculates an average position of positions of candidate points in each processing frame, and detects a vanishing point by regarding the calculated average position as the vanishing point.

An example of a method of detection of a candidate point conducted by the detection unit 152 will now be described. For example, in one processing frame, the detection unit 152 conducts Hough transform on image data of a processing frame and detects a plurality of straight lines. The detection unit 152 extracts straight lines in which an angle to the lateral direction of the screen is in a predetermined range, for example, in a range of $(45-\beta)°$ to $(45+\beta)°$ from among straight lines extending from left below to right above in a left region of the screen of the processing frame included in the detected straight lines. Furthermore, the detection unit 152 extracts straight lines in which an angle to the lateral direction of the screen is in a predetermined range, for example, in a range of $(135-\beta)°$ to $(135+\beta)°$ from among straight lines extending from right below to left above in a right region of the screen of the processing frame included in the detected straight lines. Subsequently, the detection unit 152 finds intersections of the extracted straight lines. The detection unit 152 calculates an average position of the found intersection positions, and detects the calculated average position of the intersection positions as a candidate point in one processing frame. The detection unit 152 conducts processing of detecting a candidate point for all processing frames in the same way.

Here, the processing frame is a frame imaged in a case where the vehicle travels rectilinearly. Therefore, a straight line detected by conducting Hough transform on image data in the processing frame is a straight line extending toward a vanishing point. On the other hand, a straight line detected by conducting Hough transform on image data in a frame imaged in a case where the vehicle travels on a curved road is not a straight line extending toward a vanishing point in many cases. Therefore, the detection unit 152 can detect a vanishing point accurately by making only the processing frame among a plurality of frames a target of Hough transform.

The creation unit 153 is a processing unit that conducts processing of creating a difference image from a processing specified by the frame specification unit 151 and processing of creating an average image from the created difference image.

Figure 5A:
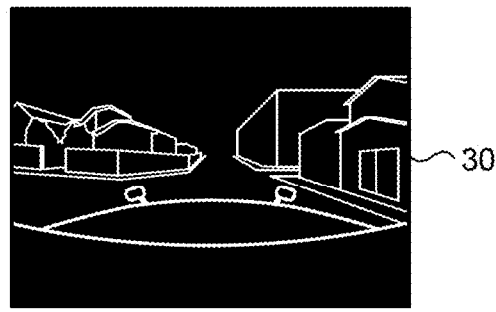
FIG. 5A is a diagram illustrating an example of a difference image.
Figure 5B:
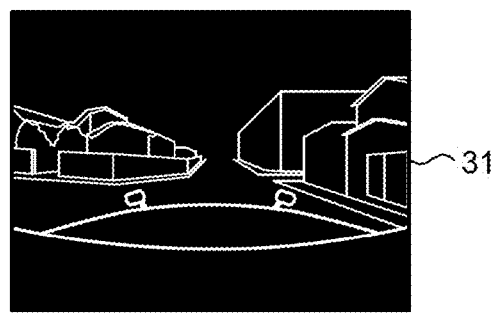
FIG. 5B is a diagram illustrating an example of a difference image.
Figure 5C:
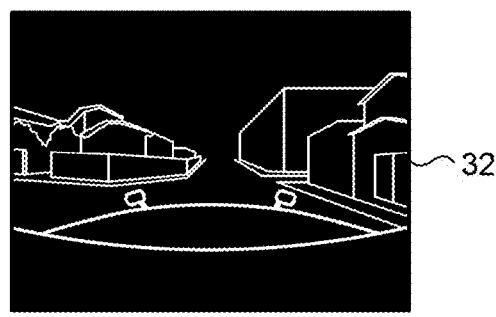
FIG. 5C is a diagram illustrating an example of a difference image.

First, processing of creating a difference image conducted by the creation unit 153 will now be described. For example, the creation unit 153 specifies a pair of two adjacent processing frames from among processing frames. For example, in a case where the four processing frames 20 to 23 illustrated in the examples of FIGS. 4A to 4D are specified by the frame specification unit 151, the creation unit 153 conducts the following processing. That is, the creation unit 153 specifies three pairs: a pair of the processing frame 20 and the processing frame 21 which are adjacent to each other, a pair of the processing frame 21 and the processing frame 22 which are adjacent to each other, and a pair of the processing frame 22 and the processing frame 23 which are adjacent to each other. In addition, the creation unit 153 creates a difference image by subtracting a pixel value of each pixel in a first processing frame from a pixel value of each pixel in a second processing frame. FIGS. 5A to 5C are diagrams illustrating an example of the difference image. For example, the creation unit 153 creates a difference image 30 as illustrated in FIG. 5A by subtracting a pixel value of each pixel in the processing frame 20 from a pixel value of each pixel in the processing frame 21. Furthermore, the creation unit 153 creates a difference image 31 as illustrated in FIG. 5B by subtracting a pixel value of each pixel in the processing frame 21 from a pixel value of each pixel in the processing frame 22. Furthermore, the creation unit 153 creates a difference image 32 as illustrated in FIG. 5C by subtracting a pixel value of each pixel in the processing frame 22 from a pixel value of each pixel in the processing frame 23.

Figure 6:
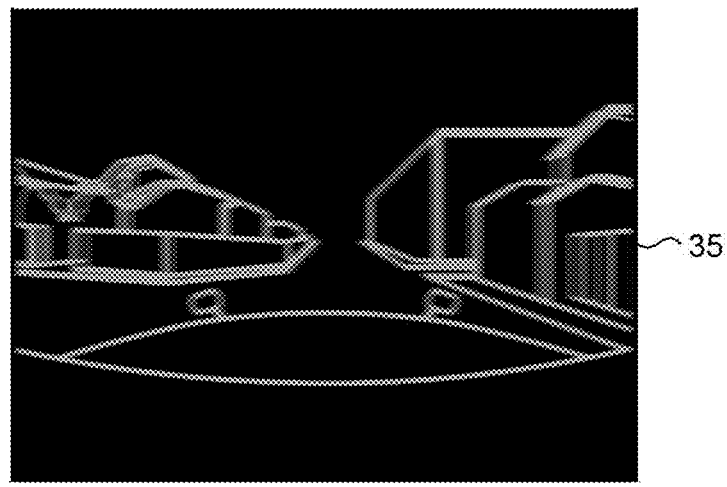
FIG. 6 is a diagram illustrating an example of a created image.

Processing of creating an average image conducted by the creation unit 153 will now be described. For example, the creation unit 153 adds a pixel value of each pixel in each created difference image every pixel. The creation unit 153 creates an average image by dividing the added pixel values of every pixel by the number of difference images. FIG. 6 is a diagram illustrating an example of a created image. For example, the creation unit 153 creates an average image 35 as illustrated in FIG. 6 by adding pixel values of each pixel in the difference images 30 to 32 every pixel and dividing the added pixels values of every pixel by the number "3" of the difference images 30 to 32.

By the way, the processing of creating the difference image and the processing of creating the average image by the creation unit 153 are not restricted to the above-described processing but the difference image and the average image can be created by using other methods such as well-known techniques.

The calculation unit 154 is a processing unit that calculates a sum total of luminance values of pixels in a lateral direction of the average image created by the creation unit 153 every pixel in a longitudinal direction of the average image. For example, a case where the average image is an average image having 640 pixels in the lateral direction (X direction) and 480 pixels in the longitudinal direction (Y direction), that is, the average image includes pixels in 480 rows and 640 columns is taken as an example in description. A sum total SUM(N) of luminance values of pixels in the Nth row ($0 \leq N \leq 479$) in this average image is represented by Equation (1) below.

$$SUM(N) = p(0,N) + p(1,N) + \ldots + p(639,N) \quad (1)$$

Here, p(x, y) indicates a luminance value of a pixel in a position (x, y) in the average image.

Figure 7:
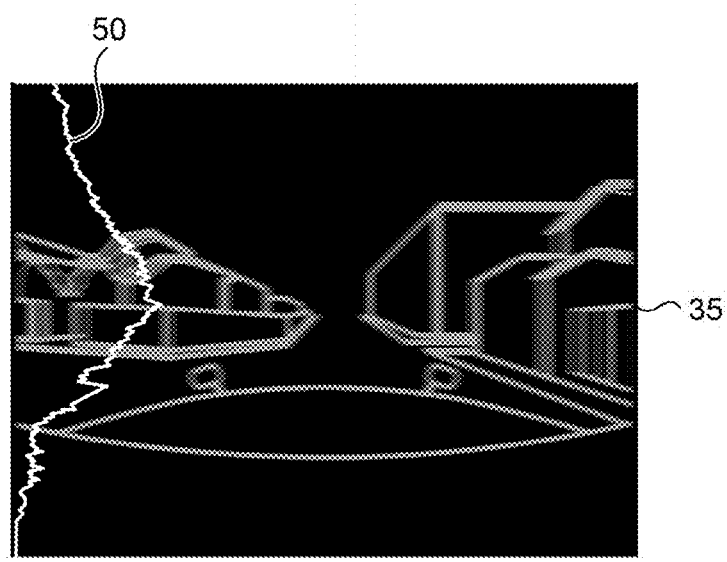
FIG. 7 is a diagram illustrating an example of a screen in a case where a graph indicating a sum total of luminance values is superposed on an average image.

The calculation unit 154 substitutes respective integers in the range of 0 to 479 into the value of N in Equation (1), and calculates a sum total of luminance values corresponding to 480 rows. FIG. 7 illustrates an example of a screen in a case where a graph indicating a sum total of luminance values is superposed on an average image. A screen in a case where a graph 50 illustrating the sum total of luminance values is superposed on an average image 35 is illustrated in FIG. 7. The graph 50 illustrated in the example in FIG. 7 indicates the sum total of luminance values every pixel in the longitudinal direction. The graph 50 in FIG. 7 indicates that the sum total of luminance values of pixels located in a corresponding Y coordinate becomes large as the position from the left end of the screen becomes large. By the way, the graph 50 can be represented by a function f(y) of a value y of a Y coordinate.

The specification unit 155 is a processing unit that specifies a tip portion of the hood. For example, the specification unit 155 first specifies a sum total having a maximum value from among sum totals SUM(0) to SUM(479) of luminance values of pixels calculated for all rows in the average image by the calculation unit 154, and specifies a Y coordinate corresponding to the specified sum total. The Y coordinate specified in this way can be considered as a Y coordinate of a vanishing point. The reason will now be described. For example, a region that is large in change in the frame is a region corresponding to scenery on the road side. With a vanishing point taken as a boundary, there are many sky regions above the vanishing point and there are many road regions below the vanishing point. In a region in a lateral direction to the vanishing point, however, sky regions and road regions are few and a region of scenery on the road side having a high luminance value is maximized. Therefore, a sum total of luminance values corresponding to the Y coordinate of the vanishing point or a vicinity of the Y coordinate is the greatest in value among calculated sum totals. Therefore, the Y coordinate corresponding to a sum total having the greatest value can be considered to be as the Y coordinate of the vanishing point.

Then, the specification unit 155 calculates a secondary differential value V(y) in a case where a value y of a Y coordinate in the downward direction of the screen as compared with the specified Y coordinate, i.e., a value y of a Y coordinate larger than the specified Y coordinate is substituted into a function f(y). For example, as an equation used when calculating the secondary differential value V(y), Equation (2) below can be used.

$$V(y) = 4*f(y) - f(y-5) - f(y-10) + f(y+5) + f(y+10) \quad (2)$$

Here, "*" is a symbol indicating multiplication.

Figure 8:
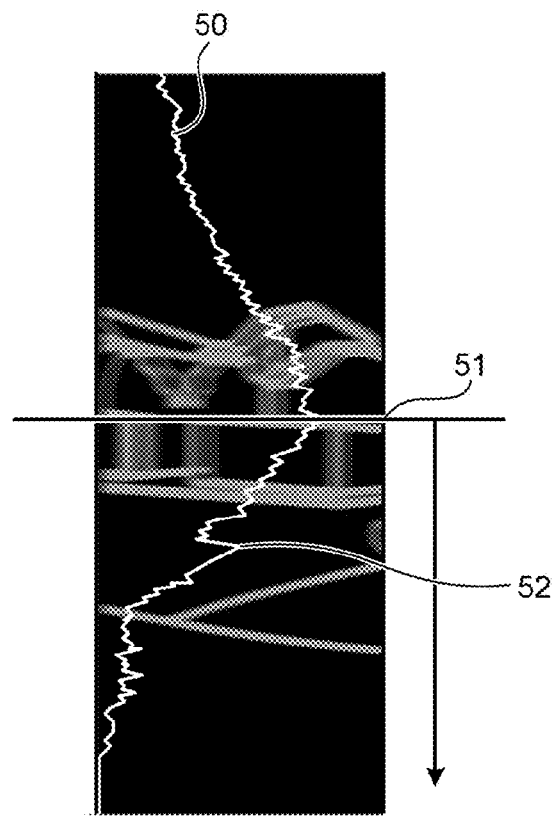
FIG. 8 is a diagram illustrating an example of a calculation method of V(y)
Figure 9:
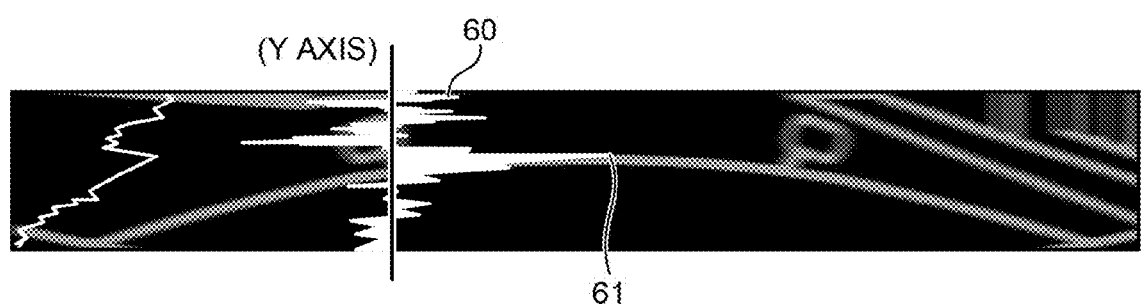
FIG. 9 is a diagram illustrating an example of a calculation method of V(y)

The specification unit 155 calculates V(y) for all values y that are in the downward direction of the screen as compared with the specified Y coordinate and that are integers, by using Equation (2). FIGS. 8 and 9 illustrate an example of a calculation method of V(y). The graph 50 is illustrated in FIG. 8. The specification unit 155 calculates a secondary differential value V(y) of f(y) for all values y that are in the downward direction of the screen as compared with a specified Y coordinate 51 in the graph 50 in FIG. 8 and that are integers. An example of a graph 60 of the secondary differential value V(y) calculated in this way is illustrated in FIG. 9. In the graph 60 in FIG. 9, a right side of a Y axis indicates a positive value, and a left side indicates a negative value.

Here, external light is reflected in a tip portion of the hood. Therefore, a difference between a sum total of luminance values corresponding to Y coordinates in a region of a tip portion of the hood in the image and a sum total of luminance value corresponding to Y coordinates in a region adjacent to the tip portion becomes as follows. That is, such a difference is greater than a difference between a sum total of luminance values corresponding to Y coordinates in a region other than the region of the tip portion and a sum total of luminance values corresponding to Y coordinates in a region adjacent to the region other than the region of the tip portion, in many cases. In many cases, therefore, a secondary differential value of the sum total of luminance values corresponding to Y coordinates in the region of the tip portion of the hood is greater than a secondary differential value of the sum total of luminance values corresponding to Y coordinates in another region. Therefore, the specification unit 155 specifies a value y' of a Y coordinate corresponding to a secondary differential value V(y') having the greatest value among calculated secondary differential values, as a value of a Y coordinate of a tip portion of the hood, i.e., a value of a Y coordinate of a point on a boundary between the hood and a road. In this way, the specification unit 155 specifies a value y' of a Y coordinate of a point at which the secondary differential value of a sum total of luminance values is highest, as a value of a Y coordinate of a point on a boundary between the hood and the road. As a result, it is possible to accurately detect a hood region of a vehicle excluded from the monitoring object region. For example, in a case where the graph 60 of the secondary differential value V(y) is calculated, the specification unit 155 specifies a value y' of a Y coordinate of a point 61 in the graph 60, as a value of a Y coordinate of a point on a boundary between the hood and the road.

Or the specification unit 155 selects a predetermined number of secondary differential values having higher values from among calculated secondary differential values, and finds values of Y coordinates of points respectively corresponding to the selected values of the predetermined number. The specification unit 155 may specify a Y coordinate y' located most in the upward direction in the frame, as a value of a Y coordinate of the tip portion of the hood, i.e., a value of a Y coordinate of a point on a boundary between the hood and the road. Depending upon the position of the light source, the light source is imaged on the hood imaged in a frame, in some cases. In such a case, there is no change in that the secondary differential value of the sum total of luminance values corresponding to Y coordinates in the region of the tip portion of the hood is roughly greater than the secondary differential value of the sum total of luminance values corresponding to Y coordinates in another region. Sometimes, however, a further greater secondary differential value is calculated at a Y coordinate in a position where the light source is imaged.

If a predetermined number of secondary differential values that are higher in value, for example, two secondary differential values that are higher in value are selected, a possibility that one of Y coordinates of two points corresponding to the selected values will be a Y coordinate of the tip portion of the hood and the other will be a Y coordinate of the light source imaged on the hood is high. In the frame, the Y coordinate of the tip portion of the hood exists in the upward direction as compared with the Y coordinate of the light source imaged on the hood. Therefore, the specification unit 155 regards a Y coordinate y' located in an upper direction in the frame from among a plurality of selected Y coordinates, as a value of a Y coordinate of a tip portion of the hood. By the way, the number of the predetermined number selected by the specification unit 155 in order of decreasing value need not be restricted to two. If the number is set equal to one, a secondary differential value having the largest value is selected as described earlier.

Figure 10:
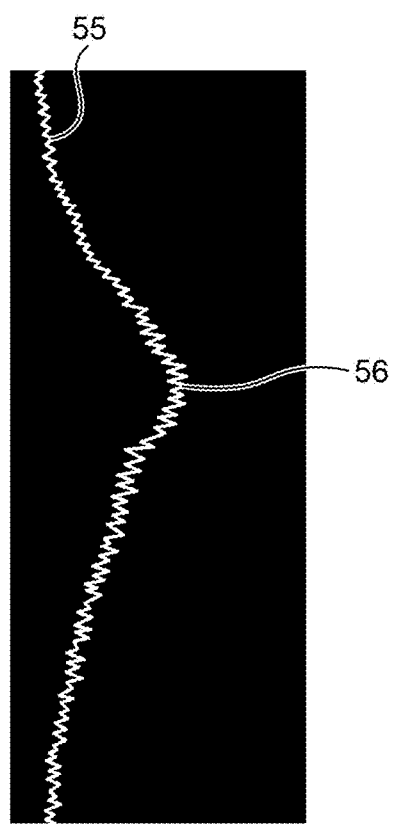
FIG. 10 is a diagram illustrating an example of a sum total value of luminance in a case where a hood region is not included in a processing frame.

By the way, in a case where the hood is included in an imaging region imaged by the camera attached to the vehicle, a point 52 where the sum total value f(y) of luminance becomes great again exists in the downward direction of the screen as compared with the specified Y coordinate 51 as illustrated in FIG. 8. On the other hand, depending upon a shape of the vehicle or a viewing angle of the camera attached to the vehicle, the hood is not included in the imaging region in some cases. FIG. 10 is a diagram illustrating an example of a sum total value of luminance in a case where a hood region is not included in the processing frame. A graph 55 of a sum total value f(y) of luminance in the case where the hood region is not included in the processing frame is illustrated in the example in FIG. 10. In the case where the hood is not included in the imaging region, a point where the sum total value f(y) of luminance becomes great again does not exist in the downward direction of the screen as compared with the specified Y coordinate 56 as illustrated in the graph 55 in FIG. 10. In such a case, therefore, a value of a Y coordinate of a point on a boundary between the hood and the road is not specified by the specification unit 155.

The determination unit 156 is a processing unit that determines a monitoring object region on the basis of the vanishing point detected by the detection unit 152 and the value y' of the Y coordinate of the point on the boundary between the hood and the road specified by the specification unit 155. For example, the determination unit 156 specifies positions of both ends of a width of an own lane at the value y' of the Y coordinate of the point on the boundary between the hood and the road.

Figure 11:
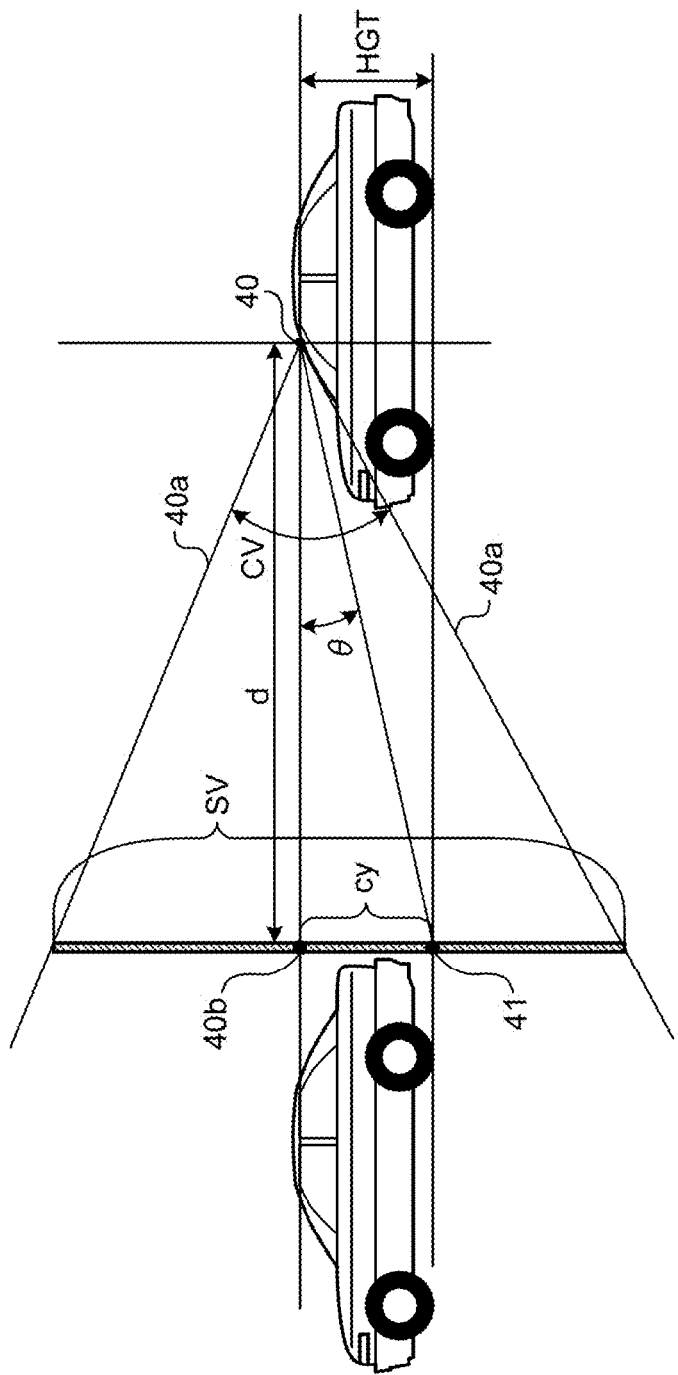
FIG. 11 is a diagram for explaining processing to be conducted to specify positions of both ends of a width of an own lane at a value y' of a Y coordinate at a point on a boundary between a hood and a road.

FIG. 11 is a diagram for explaining processing to be conducted to specify positions of both ends of a width of an own lane at a value y' of a Y coordinate at a point on the boundary between the hood and the road. First, the determination unit 156 acquires camera parameters 142. The camera parameters 142 include a horizontal angle of view CH [radian] of a camera 40, a vertical angle of view CV [radian] of the camera 40, a horizontal resolution SH [pixel] of a frame, a vertical resolution SV [radian] of the frame, and an installation height HGT [m] of the camera 40.

In FIG. 11, 40a indicates a camera visual field, and 40b indicates a position of a vanishing point. Furthermore, 41 corresponds to a detection position where a detection object is detected, on a projection plane SV which is d [m] in distance from the camera 40. Furthermore, θ [radian] in FIG. 11 is an angle formed by a straight line coupling the camera 40 and the vanishing point 40b and a straight line coupling the camera 40 and the detection position 41. Furthermore, cy [pixel] is a distance in the vertical direction between the vanishing point 40b and the detection position 41.

Since Equation (3) holds true, θ is represented by Equation (4). Furthermore, the distance d is represented by Equation (5) by use of θ.

$$cy/SV = \theta/CV \tag{3}$$

$$\theta = CV \times cy/SV \tag{4}$$

$$d = HGT/\tan(\theta) \tag{5}$$

Furthermore, an angle θ(y") [radian] formed by the straight line coupling the camera 40 and the vanishing point 40b and the straight line coupling the camera 40 and the detection position 41 in a case where a value of a Y coordinate of the detection object is y" is represented by Equation (6).

$$\theta(y") = CV \times ABS(VanY - y")/SV \tag{6}$$

Here, VanY [pixel] represents a value of a Y coordinate of the vanishing point on the frame. Furthermore, ABS(X) is a function of indicating an absolute value of X.

Furthermore, a distance d(y") [m] between the camera 40 and the projection plane SV in a case where a value of a Y coordinate of the detection object is y" is represented by Equation (7).

$$d(y") = HGT/\tan(\theta(y")) \quad (7)$$

Here, if the pixel aspect ratio of pixels is 1:1 (longitudinal: lateral), a distance SHd(y") [m] corresponding to SH [pixel] in the X direction at a value y" of a Y coordinate is represented by Equation (8).

$$SHd(y") = d(y") \times \tan(CH/2) \times 2 \quad (8)$$

Here, denoting the lane width by Wd [m], a road width W(y") [pixel] on the frame is represented by Equation (9).

$$W(y") = SH \times Wd/SHd(y") \quad (9)$$

Here, denoting a value of a Y coordinate of a point on the boundary between the hood and the road by y', a road width W(y') on the boundary between the hood and the road is represented by Equation (10).

$$W(y') = SH \times Wd/SHd(y') \quad (10)$$

In addition, the determination unit 156 specifies positions p1(VanX−(W(y')/2), y') and p2(VanX+(W(y')/2), y') of both ends of a width of an own lane at the value y' of the Y coordinate of the point on the boundary between the hood and the road. By the way, VanX [pixel] represents a value of an X coordinate of the vanishing point on the frame.

Figure 12:
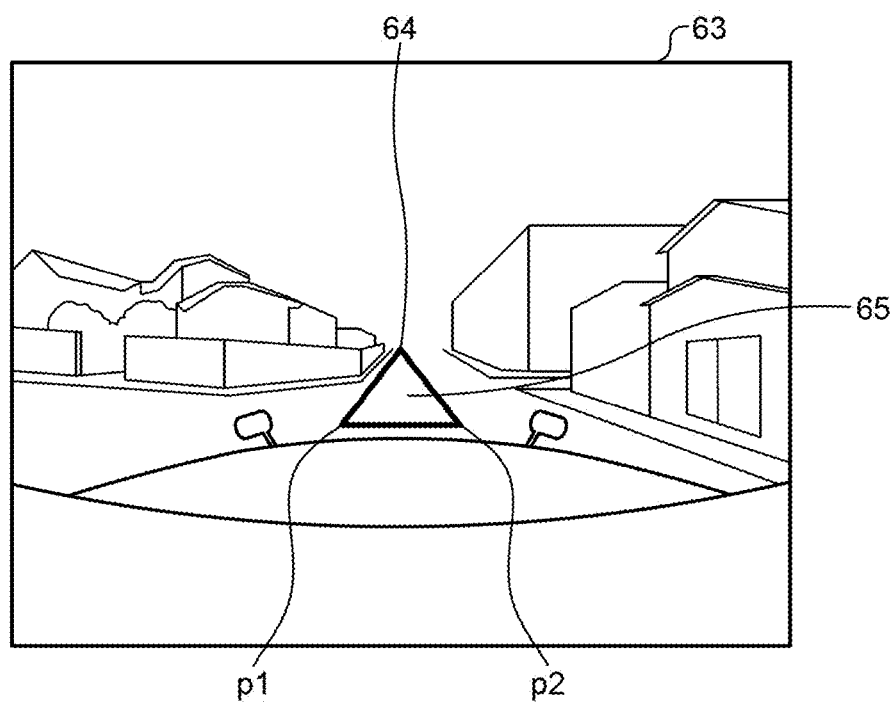
FIG. 12 is a diagram illustrating an example of a monitoring object region.

Upon specifying the positions p1 and p2 of both ends of the width of the own lane, the determination unit 156 determines a region coupling the vanishing point, the position p1, and the position p2 as a monitoring object region. FIG. 12 is a diagram illustrating an example of the monitoring object region. As illustrated in the example in FIG. 12, the determination unit 156 determines, on a frame 63, a region coupling the vanishing point 64, and the positions p1 and p2 of both ends of the width of the own lane as a monitoring object region 65.

The distance calculation unit 157 is a processing unit that sets the monitoring object region determined by the determination unit 156 in each frame included in the drive recorder information 141, detects a body of a detection object in the monitoring object region, and calculates a distance between the detected body and the camera.

For example, the distance calculation unit 157 acquires the drive recorder information 141 and the camera parameters 142, and sets a monitoring object region in each frame included in the drive recorder information 141. The distance calculation unit 157 attempts to detect a body of a detection object existing in the monitoring object region every frame. By the way, the distance calculation unit 157 can attempt to detect a body by using a well-known technique. In a case where a body can be detected, the distance calculation unit 157 calculates a distance D(x", y") between the camera 40 and the body in a case where a value of an X coordinate of the body of the detection object is x" and a value of a Y coordinate of the body of the detection object is y", by using the following parameters and Equation (11). In other words, the distance calculation unit 157 calculates the distance D(x", y") by using the value y' of the Y coordinate of a point on the boundary between the hood and the road, the position of the vanishing point (VanX, VanY), and the above-described horizontal angle of view CH, vertical angle of view CV, horizontal resolution SH, vertical resolution SV, and installation height HGT.

$$D(x",y") = SHd(y") \times (x"-VanX)/SH \quad (11)$$

The decision unit 158 is a processing unit that makes a decision whether the so-called "near miss" is occurring on the basis of the distance between the body of the detection object and the camera calculated by the distance calculation unit 157, and the acceleration, the velocity and so forth in the drive recorder information 141 or the like.

For example, the decision unit 158 makes a decision whether the so-called "near miss" is occurring every frame on the basis of the distance between the body of the detection object and the camera calculated by the distance calculation unit 157, and the acceleration, the velocity and so forth in the drive recorder information 141 or the like. By the way, the decision unit 158 can make a decision whether "near miss" is occurring by using a well-known technique. Then, the decision unit 158 outputs a decision result of every frame to the display unit 130, and causes the display unit 130 to display the decision result.

Figure 13:
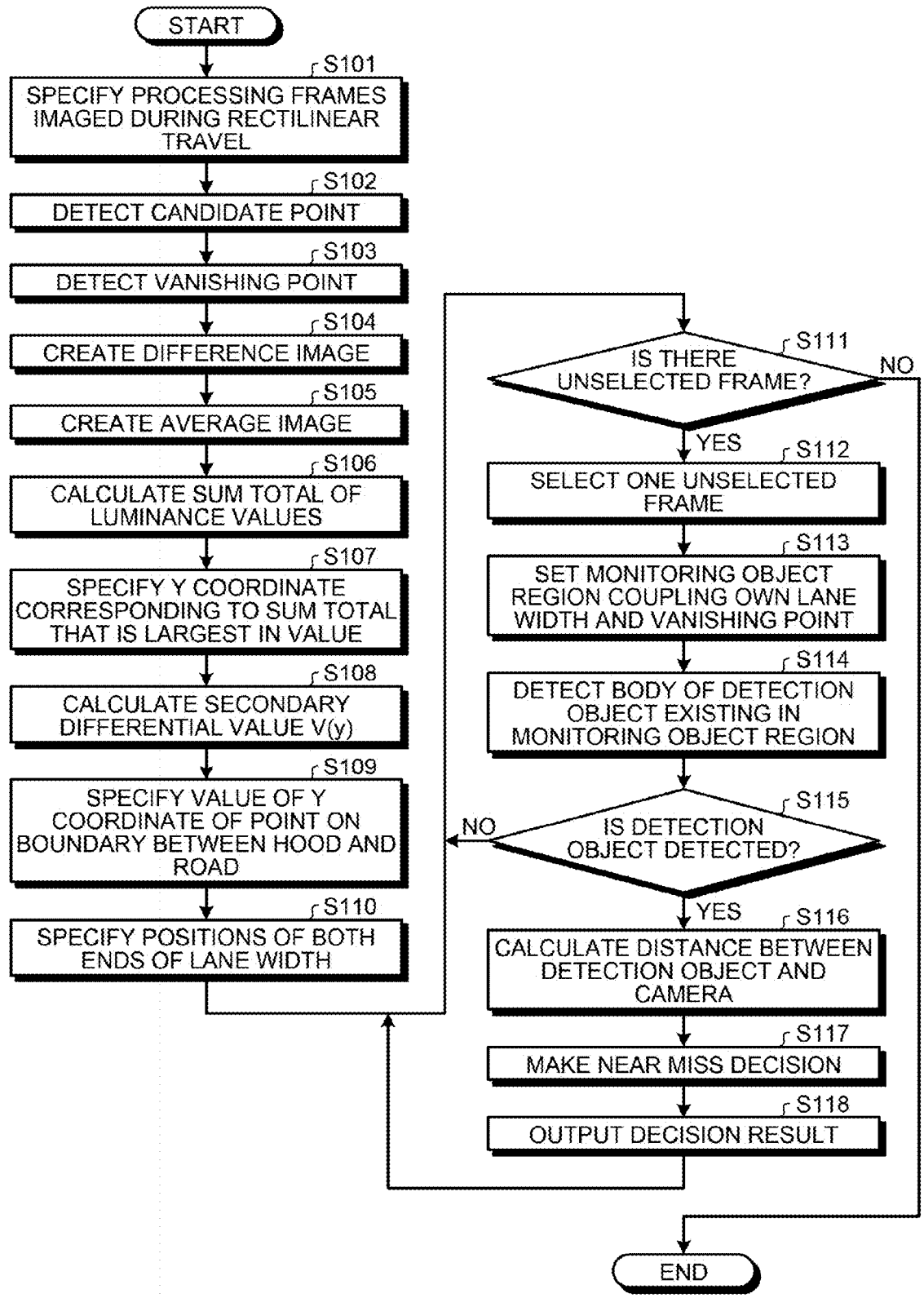
FIG. 13 is a flow chart illustrating a processing procedure in the image processing apparatus according to the second embodiment.

A processing procedure of the image processing apparatus 100 according to the second embodiment will now be described. FIG. 13 is a flow chart illustrating a processing procedure of the image processing apparatus according to the second embodiment. For example, the processing illustrated in the flow chart in FIG. 13 is executed with acceptance of a processing execution instruction as momentum. The image processing apparatus 100 may accept the processing execution instruction from the input unit 120, or may accept the processing execution instruction from another device via the communication unit 110.

As illustrated in FIG. 13, the image processing apparatus 100 specifies processing frames imaged in a case where the vehicle mounting the drive recorder and the camera travels rectilinearly, by referring to the drive recorder information 141 (step S101). The image processing apparatus 100 detects a candidate point in each processing frame (step S102). The image processing apparatus 100 detects a vanishing point by calculating an average position of positions of candidate points in each processing frame and regarding the calculated average position as the vanishing point (step S103).

The image processing apparatus 100 creates a difference image from processing frames (step S104). The image processing apparatus 100 creates an average image from created difference images (step S105). The image processing apparatus 100 calculates a sum total of luminance values of pixels in the lateral direction in the average image every pixel in the longitudinal direction in the average image (step S106).

The image processing apparatus 100 specifies a Y coordinate corresponding to a sum total having the greatest value from among sum totals of luminance values of pixels calculated for all rows in the average image (step S107). The image processing apparatus 100 calculates a secondary differential value V(y) of f(y) for all values y that are in the downward direction of the screen as compared with the specified Y coordinate and that are integers (step S108). The image processing apparatus 100 calculates values of Y coordinates of points corresponding to a predetermined number of secondary differential values that are larger in value, from among the calculated secondary differential values V(y), and conduct the following processing. That is, the image processing apparatus 100 specifies a value y' of a Y coordinate located most in the upward direction in the frame from among the calculated Y coordinates, as a value of a Y coordinate of a point on the boundary between the hood and the road (step S109).

The image processing apparatus 100 specifies positions p1 and p2 of both ends of the width of the own lane at a value y' of a Y coordinate of a point on the boundary between the hood and the road (step S110). The image processing apparatus 100 makes a decision whether there is an unselected frame in frames included in the drive recorder information 141 (step S111). In a case where there isn't an unselected frame (step S111, No), the processing is finished.

On the other hand, in a case where there is an unselected frame (step S111, Yes), the image processing apparatus 100 selects one unselected frame (step S112). The image processing apparatus 100 sets a monitoring object region in the selected frame (step S113). The image processing apparatus 100 attempts to detect a body of detection object existing in the set monitoring object region (step S114).

The image processing apparatus 100 makes a decision whether a body could be detected (step S115). In a case where a body could be detected (step S115, Yes), the image processing apparatus 100 calculates a distance between the camera 40 and the body (step S116). The image processing apparatus 100 makes a decision whether "near miss" is occurring in the frame on the basis of the distance between the body of the detection object and the camera calculated by the distance calculation unit 157, and the acceleration, the velocity and so forth in the drive recorder information 141 or the like (step S117). The image processing apparatus 100 outputs a result of the decision to the display unit 130 and causes the display unit 130 to display the result of the decision (step S118) and returns to the step S111. On the other hand, in a case where a body could not be detected (step S115, No) as well, the image processing apparatus 100 returns to the step S111.

Effects of the image processing apparatus 100 according to the second embodiment will now be described. The image processing apparatus 100 creates an average image of difference images in moving picture data on the basis of a difference between two adjacent processing frames in one moving picture data, and calculates a sum total of luminance values of pixels in the lateral direction in the created average image every pixel in the longitudinal direction in the average image. The image processing apparatus 100 selects a predetermined number of points that are higher in value of a secondary differential value of sum total of luminance values from among points located in the downward direction as compared with the vanishing point in the average image, and specifies a value y' of a Y coordinate of a point on the boundary between the hood and the road from among the predetermined number of selected points. For example, external light is reflected in the tip portion of the hood. Therefore, a difference between a sum total of luminance values corresponding to Y coordinates in a region of a tip portion of the hood and a sum total of luminance value corresponding to Y coordinates in a region adjacent to the tip portion becomes as follows. That is, such a difference is greater than a difference between a sum total of luminance values corresponding to Y coordinates in a region other than the region of the tip portion and a sum total of luminance values corresponding to Y coordinates in a region adjacent to the region other than the region of the tip portion, in many cases. In many cases, therefore, a secondary differential value of the sum total of luminance values corresponding to Y coordinates in the region of the tip portion of the hood is greater than a secondary differential value of the sum total of luminance values corresponding to Y coordinates in another region. Furthermore, depending upon the position of the light source, the light source is imaged on the hood imaged in a frame, in some cases. In such a case, there is no change in that the secondary differential value of the sum total of luminance values corresponding to Y coordinates in the region of the tip portion of the hood is roughly greater than the secondary differential value of the sum total of luminance values corresponding to Y coordinates in another region. Sometimes, however, a further greater secondary differential value is calculated at a Y coordinate in a position where the light source is imaged. The image processing apparatus 100 selects a predetermined number of points that are higher in secondary differential value of sum total of luminance values, and specifies a point on the boundary between the hood and the road from among the predetermined number of selected points. As a result, it is possible to accurately detect a hood region of the vehicle excluded from the monitoring object region.

Furthermore, the image processing apparatus 100 specifies processing frames imaged in a case where a moving body travels rectilinearly from among a plurality of frames in moving picture data imaged by the camera 40 mounted on the moving body such as a vehicle, on the basis of information concerning movement of the moving body such as acceleration and movement. The image processing apparatus 100 extracts straight lines extending from left below to right above in a left region of the screen and straight lines extending from right below to left above in a right region of the screen every specified processing frame, and detects a vanishing point on the basis of intersections of the extracted straight lines. The image processing apparatus 100 determines a monitoring object region on the basis of the detected vanishing point and the specified point on the boundary between the hood and the road. Here, the processing frame is a frame imaged in a case where the vehicle travels rectilinearly. Therefore, a straight line detected from the processing frame is a straight line extending toward the vanishing point. On the other hand, a straight line detected from a frame imaged in a case where the vehicle travels on a curved road is not a straight line extending toward the vanishing point in many cases. The image processing apparatus 100 detects a straight line from processing frames included in a plurality of frames and detects a vanishing point. Therefore, it is possible to detect the vanishing point accurately.

Furthermore, the image processing apparatus 100 calculates the distance between the camera 40 and the body by using the value y' of the Y coordinate of a point on the boundary between the hood and the road, the position of the vanishing point (VanX, VanY), and the above-described horizontal angle of view CH, vertical angle of view CV, horizontal resolution SH, vertical resolution SV, and installation height HGT. Therefore, the image processing apparatus 100 calculates the distance between the camera 40 and the body by using the vanishing point detected with high precision. As a result, the distance between the camera 40 and the body can be calculated with high precision.

Figure 14:
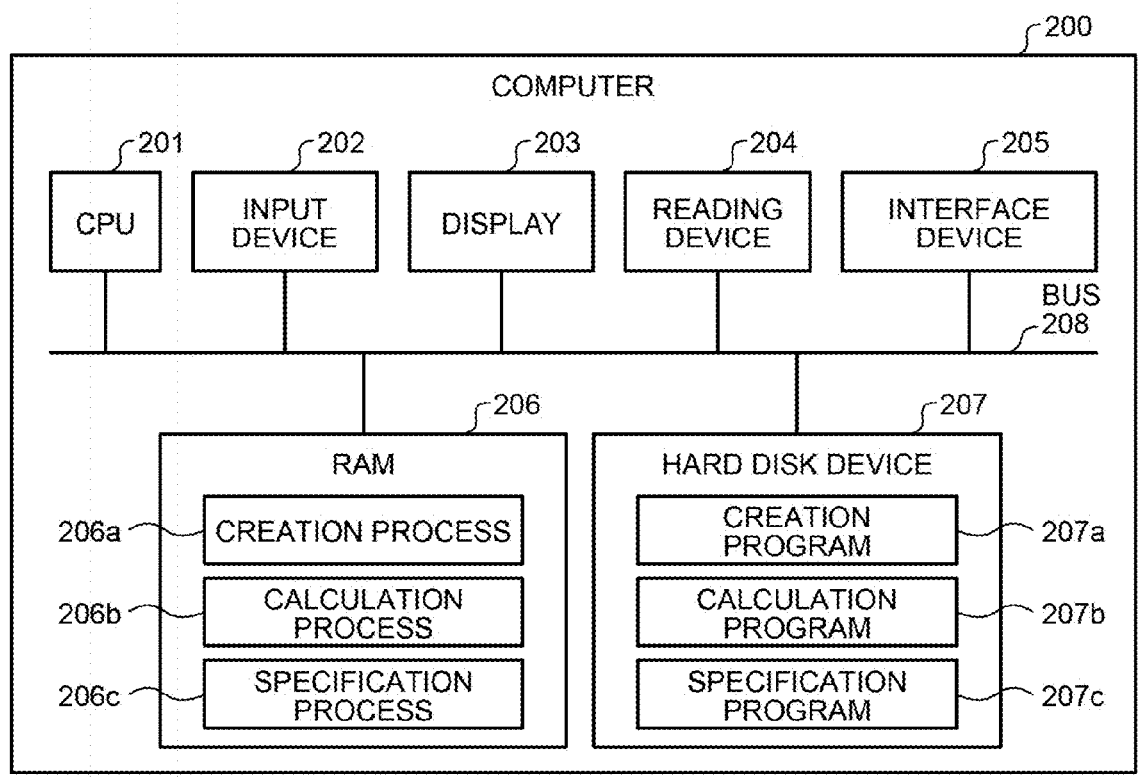
FIG. 14 is a diagram illustrating an example of a computer that executes an image processing program.

An example of a computer that executes an image processing program that implements a function similar to that of the image processing apparatus according to the embodiment will now be described. FIG. 14 is a diagram illustrating an example of a computer that executes an image processing program.

As illustrated in FIG. 14, a computer 200 includes a CPU 201 which executes various kinds of arithmetic processing, an input device 202 which accepts data input from a user, and a display 203. The computer 200 further includes a reading device 204 which reads a program and so forth from a storage medium, and an interface device 205 which conducts giving and receiving of data with another computer via a network. Furthermore, the computer 200 includes RAM 206 which temporarily stores various kinds of information, and a hard disk device 207. The devices 201 to 207 are connected to a bus 208.

The hard disk device 207 includes, for example, a creation program 207a, a calculation program 207b, and a specification program 207c. The CPU 201 reads out respective programs 207a to 207c, and develops them on the RAM 206.

The creation program 207a functions as a creation process 206a. The calculation program 207b functions as a calculation process 206b. The specification program 207c functions as a specification process 206c.

For example, the creation process 206a corresponds to the creation units 11, 153 and so forth. The calculation process 206b corresponds to the calculation units 12, 154 and so forth. The specification process 206c corresponds to the specification units 13, 155 and so forth.

By the way, the programs 207a to 207c are not always stored in the hard disk device 207 from the beginning. For example, respective programs are stored in a "portable physical medium" such as a flexible disk (FD), a CD-ROM, a DVD disk, a magneto-optical disk, and an IC card inserted into the computer 200, and the computer 200 may read out the respective programs 207a to 207c from them and execute the respective programs 207a to 207c.

Furthermore, a frame specification program, a detection program, a determination program, a distance calculation program, and a decision program may be further stored in the hard disk device 207. In this case, the CPU 201 reads these respective programs in addition to the respective programs 207a to 207c and develops them on the RAM 206. The frame specification program functions as a frame specification process. The detection program functions as a detection process. The determination program functions as a determination process. The distance calculation program functions as a distance calculation process. The decision program functions as a decision process. For example, the frame specification process corresponds to the frame specification unit 151 and so forth. The detection process corresponds to the detection unit 152 and so forth. The determination process corresponds to the determination unit 156 and so forth. The distance calculation process corresponds to the distance calculation unit 157 and so forth. The decision process corresponds to the decision unit 158 and so forth.

According to an aspect of an embodiment, an effect that the hood region of a vehicle excluded from the monitoring object region can be detected accurately is brought about.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a processor configured to execute a process including:
creating an average image of difference images in moving picture data based on a difference between a first frame and a second frame adjacent to the first frame, the first frame and the second frame included in the moving picture data;
calculating a sum total of luminance values arranged in a lateral direction of the average image for each point in a longitudinal direction of the average image;
selecting a predetermined number of points that are higher in value of a secondary differential value of the sum total of luminance values, from among points located in a downward direction from a position of a vanishing point in the average image, and
firstly specifying a point that is on a boundary between a hood and a road from among the predetermined number of selected points.

2. The image processing apparatus according to claim 1, wherein the process further comprising:
secondly specifying frames imaged in a case where a moving body travels rectilinearly, from among a plurality of frames in the moving picture data imaged by a camera mounted on the moving body, based on information concerning movement of the moving body;
extracting straight lines extending in a direction from left below toward right above in a left region of a screen and straight lines extending in a direction from right below toward left above in a right region of the screen,
detecting a vanishing point based on an intersection of the extracted straight lines; and
determining a monitoring object region based on the vanishing point detected by the detection unit and a point on a boundary between a hood and a road specified in the firstly specifying.

3. The image processing apparatus according to claim 2, wherein the process further comprising
calculating a distance to a body in the monitoring object region based on a point on a boundary between a hood and a road specified in the firstly specifying, the vanishing point detected in the detecting, angles of view in a horizontal direction and a vertical direction of the camera, an installation height of the camera, and resolution information of the camera.

4. An image processing method executed by a computer, comprising:
creating an average image of difference images in moving picture data based on a difference between a first frame and a second frame adjacent to the first frame, the first frame and the second frame included in the moving picture data;
calculating a sum total of luminance values arranged in a lateral direction of the average image for each point in a longitudinal direction of the average image;
selecting a predetermined number of points that are higher in value of a secondary differential value of the sum total of luminance values, from among points located in a downward direction from a position of a vanishing point in the average image, and
firstly specifying a point that is on a boundary between a hood and a road from among the predetermined number of selected points.

5. A non-transitory computer-readable recording medium storing an image processing program that causes a computer to execute a process comprising:
creating an average image of difference images in moving picture data based on a difference between a first frame and a second frame adjacent to the first frame, the first frame and the second frame included in the moving picture data;
calculating a sum total of luminance values arranged in a lateral direction of the average image for each point in a longitudinal direction of the average image;

selecting a predetermined number of points that are higher in value of a secondary differential value of the sum total of luminance values, from among points located in a downward direction from a position of a vanishing point in the average image, and firstly specifying a point that is on a boundary between a hood and a road from among the predetermined number of selected points.

\* \* \* \* \*